United States Patent [19]

Sakuraoka

[11] Patent Number: 4,756,266
[45] Date of Patent: Jul. 12, 1988

[54] ELASTICALLY DEFORMABLE FENDER

[75] Inventor: Makoto Sakuraoka, Kobe, Japan

[73] Assignee: Sumitomo Rubber Industries, Ltd., Japan

[21] Appl. No.: 20,207

[22] Filed: Feb. 27, 1987

Related U.S. Application Data

[63] Continuation of Ser. No. 731,543, May 7, 1985, abandoned.

[30] Foreign Application Priority Data

May 10, 1984 [JP] Japan .................. 59-94376

[51] Int. Cl.⁴ .............................................. B63B 59/02
[52] U.S. Cl. .................................. 114/219; 267/140; 405/215
[58] Field of Search ................ 114/219; 267/140; 405/215

[56] References Cited

U.S. PATENT DOCUMENTS

| | | | |
|---|---|---|---|
| 3,638,985 | 1/1972 | Barton et al. | 114/219 |
| 3,820,495 | 6/1974 | Ueda | 114/219 |
| 3,949,697 | 4/1976 | Ueda | 114/219 |
| 4,267,792 | 5/1981 | Kimura et al. | 405/215 |

FOREIGN PATENT DOCUMENTS

| | | | |
|---|---|---|---|
| 0092893 | 11/1983 | European Pat. Off. | |
| 2524886 | 5/1976 | Fed. Rep. of Germany | 114/219 |
| 2436915 | 4/1980 | France | |
| 977557 | 11/1982 | U.S.S.R. | 405/215 |

Primary Examiner—Joseph F. Peters, Jr.
Assistant Examiner—Thomas J. Brahan
Attorney, Agent, or Firm—Ostrolenk, Faber, Gerb & Soffen

[57] ABSTRACT

An elastically deformable fender comprising an impact receiving section having a predetermined thickness and a top surface being formed flat and forming a contact surface with a broadside, a pair of supporting sections extending from the reverse side of the impact receiving section mentioned above so as to diverge away from each other in an unfolded fan fashion and formed integrally with the impact receiving section, and fitting sections expanding outwardly from the ends of the supporting sections in parallel to the contact surface aforementioned. The thickness of the impact receiving section mentioned above is formed thick so as to protrude distinctly from the supporting sections and the width is formed smaller than the span between the heels of the supporting sections. Furthermore, between the supporting sections on the reverse side of the impact receiving section a hollow portion is formed lengthwise for preventing the impact receiving section from curving when the contact load of a ship is applied.

3 Claims, 4 Drawing Sheets

Amount of Deformation

ELASTICALLY DEFORMABLE FENDER

This is a continuation of application Ser. No. 731,543, filed on May 7, 1985, in the name of Makoto Sakuraoka, for "ELASTICALLY DEFORMABLE FENDER" now abandoned.

BACKGROUND OF THE INVENTION

The present invention relates to an elastically deformable fender. As the elastically deformable fender, a so-called V-shaped fender has long been used widely. The V-shaped fender, as shown in FIG. 9, includes an elongated body, wherein a flat impact receiving section (1) for receiving the broadside, a pair of supporting sections (2) with legs diverging away from each other in an unfolded fan fashion and a fitting section (3) extending outwardly from the lower ends of each supporting section (2) being formed integrally, and has a substantially inverted V-shaped cross section.

Meanwhile, in the V-shaped fender aforementioned, when the impact receiving section (1) is compressed by an impact load of the hull of a ship, superfluous rubber in the impact receiving section (1) tends to expand outwardly into a space between the supporting sections (2), consequently, as shown by the dotted line in FIG. 9, curving the impact receiving section (1) in the direction of downward expansion of the center portion in the drawing at the start of the application of the impact load of the hull of the ship. Since the bending of the supporting sections (2) are accelerated by the curving as described above, the supporting sections (2) become bending from the start of the application of the impact load of the hull.

Then the supporting sections (2) bend and deform as continuously contacting the broadside as shown by a dotted single line in the drawing, reaching further limited range of deformation within a short period of time and cause a sudden rise of the reaction force relatively in a short time. This is exactly as shown in a performance curve (X) in FIG. 10, thereby it is clear that the sudden rise of the reaction force occurs when the magnitude of compression is approximately 40%. In order to improve the absorbing performance of the impact energy of the V-shaped fender, the starting time of the bending of the supporting sections (2) should be delayed as much as possible and the amount of deformation thereof should be larger by avoiding the contact between the broadside and the outer surface of the supporting sections (2).

In consideration of this fact, there has been proposed a fender having a center groove extending lengthwise on the top surface (i.e. contact surface with the broadside) of the impact receiving section (refer to Japanese Patent Publication No. 55-12923 and U.S. Pat. No. 3,820,495). Since the side portions on both sides of the center groove are compressed in a direction of the groove when the impact is applied according to said kind of the fender, the fender is influenced by the top surface area and variations of frictional coefficient of the broadside and hence the absorbing performance of the impact energy is not always stable (refer to the performance curves (Y) and (Z) in FIG. 10, wherein (Y) and (Z) representing the cases of small and large frictional coefficients, respectively).

In order to solve such problems as described above, the applicant has proposed a fender having a suitable ratio between the width of the impact receiving section and the span between the heels of the supporting sections, and the impact receiving section (1) with the thickness thereof being formed thick so as to clearly protrude outward from the supporting sections (refer to Japanese Patent Publication No. 56-9604, U.S. Pat. No. 4,267,792, British Pat. No. 2032050, F.R.G. Patent Offen No. 28566200A and French Pat. No. 2413584).

With this fender, it has been discovered that the similar curving as the state shown by the dotted lines in FIG. 9 has occurred again because of the fact that the distance between the upper ends of the supporting sections expanding inevitably when the improvement was made to reduce the surface pressure applied on the broadside by forming the impact receiving section widely and widening the top surface area thereof.

Since the curving of the impact receiving section cause the reduction in contact surface between the broadside and the impact receiving section in this way, the broadside is exposed to an excessive stress, which involves such a disadvantage in that the broadside will be susceptible to inflicting damage, denting the ship's hull in particular, in case of such a large ship as a tanker.

The present invention was made in view of this problem as described above in order to provide the elastically deformable fender the performance of absorbing the impact energy to the broadside of ships from inflicting damage with a simple structure.

The present invention relates to the elastically deformable fender comprising an impact receiving section having a flat contact surface with the broadside with predetermined thickness, a pair of supporting sections depending from the reverse side of the impact receiving section described above so as to diverge away from each other in an unfolded fan fashion and being formed integrally with the impact receiving section, and the fitting sections protruding outwardly from the ends of the supporting sections in parallel to the contact surface described above, wherein the thickness of the impact receiving section is formed thick so as to protrude from the supporting sections by the predetermined length and the width is formed smaller than the span between the heels of the supporting sections, while between the supporting sections on the reverse side of the impact receiving section a hollow portion is formed lengthwise for preventing the impact receiving section from curving.

BRIEF DESCRIPTION OF THE PREFERRED EMBODIMENTS

Figure 1:
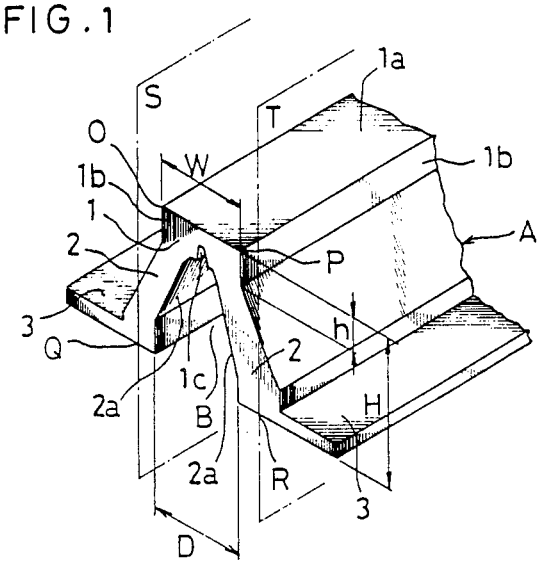
FIG. 1 is a perspective view showing the elastically deformable fender.

In FIG. 1, an elastically deformable fender (A) made of an elastic material such as rubber comprises an impact receiving section (1) having a top surface (1a) forming a contact surface having been formed flat, a pair of supporting sections (2) extending from both sides on the reverse surface of the impact receiving section (1) diverging in an unfolded fan fashion and formed integrally with the impact receiving section (1) so as to jointly form a hollow portion (B) having a substantially trapezoid-shaped cross section and also a fitting section (3) on each end of the supporting sections (2) extending outwardly and in parallel to the top surface (1a) of the impact receiving section (1) described above.

Said impact receiving section (1) aforementioned is formed thick so as to constitute the side walls (1b) at right angle or substantially right angle with respect to the top surface (1a) and to protrude distinctly from the upper end of the supporting sections (2). Thus, by forming the impact receiving section (1) thick, the curving of the impact receiving section (1) at the start of the application of the impact load of the hull of the ship can be restrained, and thereby the time at which the supporting sections (2) start bending can be retarded as much as possible, as well as that the contacting time of the supporting sections (2) with the broadside plate during the bending action of the supporting sections (2) thereafter, can be delayed as long as possible, therefore ensuring the large amount of deformation thereof. In order to exhibit such a working efficiency pertinently, the thickness (h) of the impact receiving section (1) is suitably set within the range of 0.1H to 0.3H, more preferably within the range of 0.2H to 0.25H with respect to the total height (H) of the fender (A), and the formed width (W) within range of 1.0H to 1.3H, more preferably around 0.12H. However, the thickness of the supporting section (2) is set within the range of 0.2H to 0.4H. Where the thickness (h) of the impact receiving section (1) is smaller than the range described above, there is the possibility, as is the case with the conventional V-shaped fender, that is the supporting sections (2) will be bent at a relatively early stage of the application of the impact load of the hull of the ship, with the bent supporting sections (2) contacting the broadside relatively early and increasing the application area O-P of the impact load to such an extent as to invite reduction of the energy absorbing performance of the fender. On the other hand, where the thickness (h) of the impact receiving section (1) is greater than the range aforementioned, the length (H minus h) of the supporting sections (2) may reduce relatively, tending to increase the reaction force excessively in a short time after the application of impact, and therefore, the amount of deformation of the supporting sections (2) will no longer be maintained.

Figure 4:
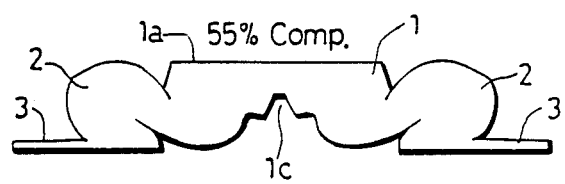
FIG. 4 is a front view showing a deformation when the magnitude of compression is 55%.

Furthermore, the width (W) of the impact receiving section (1) is formed smaller than the inside span (D) between the heels of the supporting sections (2), and the application area O-P of the impact load of the hull is adapted to be positioned constantly within the position (S) (T) extending upwardly from the fulcrums (Q)(R) at the bottom of the supporting sections (2) during a working period, from the start of the application of the impact of the hull (state in FIG. 2) to the completion of the application of the impact load, where the bent supporting sections (2) become constantly the broadside (state in FIG. 4), thereby avoiding the possible excessive reaction force on the fender (A) and hence improving the impact energy absorbing performance by the involution effect with the structures of the impact receiving section (1) and the supporting section (2) described above.

On the other hand, at the center portion on the reverse side of the impact receiving section (1), a groove (1C) as a hollow portion is formed continuously lengthwise of the fender (A) in a trapezoid-shaped cross section with a deep narrow portion, the depth thereof is preferably less than approximately half of the thickness (h) of the impact receiving section (1), while the width may be selected suitably in association with the volumetric ratio of the impact receiving section (1).

Figure 2:
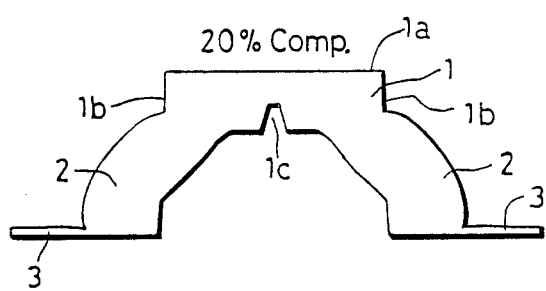
FIG. 2 is a front view showing a deformation when the magnitude of compression is 20%.
Figure 3:
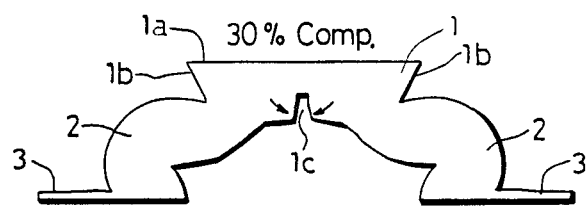
FIG. 3 is a front view showing a deformation when the magnitude of compression is 30%.

When the groove (1C) is formed, with the groove (1C) serving as the relief of the rubber which is cubically incompressible at the state of the application of the impact load of the hull, the curving of the impact receiving section (1) can be completely retarded and hence such disadvantages as the damage to the broadside caused by the uniform contact may be avoided (refer to FIGS. 2 and 3).

Figure 10:
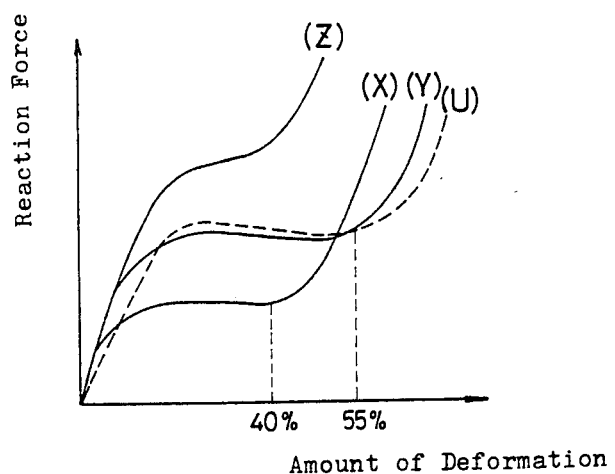
FIG. 10 is a performance diagram showing an impact energy absorbing characteristic of a fender.
Figure 11:
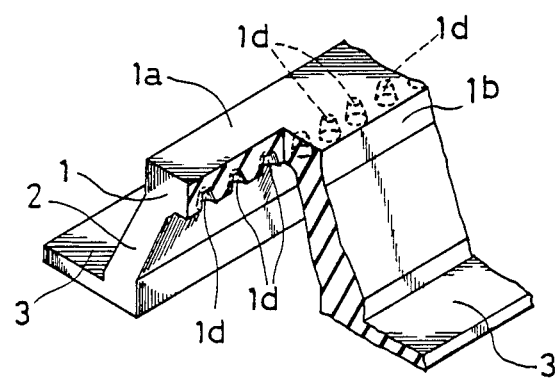
FIG. 11 is a perspective view partly in cross-section showing the interior of a deformable bumper.
Figure 12:
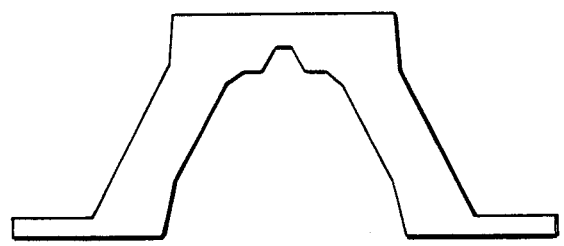
FIG. 12 is an end view of a deformable bumper showing a bent supporting section.

Meanwhile, it is preferable for the supporting section (2) that at least the inner surface (2a) of the lower end area be preferably bent widthwise at the intermediate portions thereof in a direction approaching each other, thereby the impact energy absorbing performance may be improved more. Namely, because the supporting sections (2) are bent at the intermediate portions, when the supporting section (2) starts bending, the bending aforementioned is forcibly made to start from the lower portions of the supporting sections (2) as shown in FIG. 2. Accordingly, the extreme lowering of rigidity accompained with the start of bending action of the supporting section (2) can be restrained, and at the same time the contacting time of the supporting section (2) with the broadside can be retarded all the more (contacting starts approximate at 55% compression), therefore, coupled with the structure of the impact receiving reaction (1) described above, the impact energy absorbing performance may be improved. The performance curve of the impact energy absorbing effect of the fender (A) aforementioned is represented by the curve (U) in FIG. 10.

Figure 5:
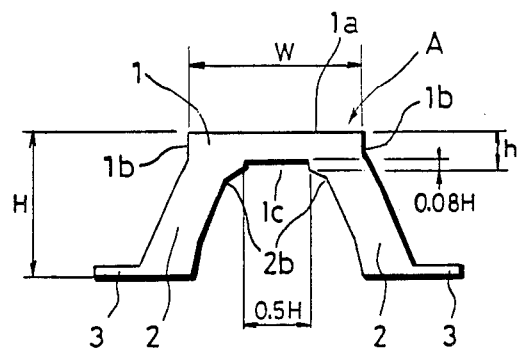
FIG. 5 is a front view showing another embodiment.

Now the embodiment in FIG. 5 shows the groove (1C) formed widely. In the embodiment, the thickness (h) of the impact receiving section (1) is set at 0.25H with respect to the total height (H) of the fender (A) and the width (W) at 1.2H. While the depth of the groove (1C) is formed at 0.08H and the width at 0.5H respectively.

Figure 6:
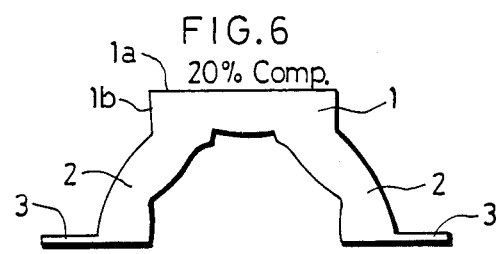
FIG. 6 is a front view showing a deformation of the embodiment in FIG. 5 when the magnitude of compression is 20%.
Figure 7:
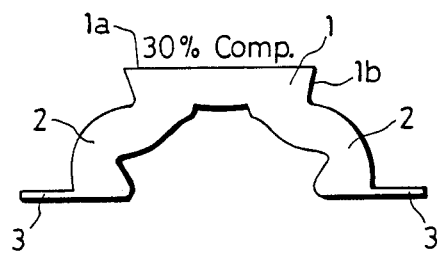
FIG. 7 is similarly a front view when the magnitude of compression is 30%.
Figure 8:
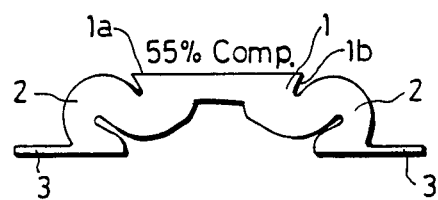
FIG. 8 is similarly a front view when the magnitude of compression is 55%.
Figure 9:
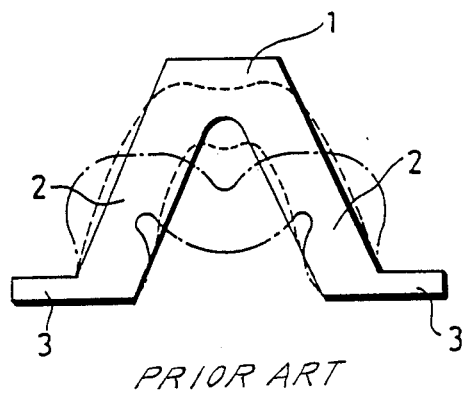
FIG. 9 is a front view showing a conventional fender.

Thus, when forming the groove (1C) widely the volume of the groove (1C) is formed preferably within the range of 5% to 15%, and more preferably within 10% to 15% of the volume of the impact receiving section (1). Within such ranges of volumetric ratios various selections of depth and widths of the groove (1C) can be made, but if the width is decided too narrow the depth thereof is increased inevitably, which results in the thin thickness of the impact receiving section (1) and thus allowing the reduction of the rigidity. Accordingly, in the case mentioned above, the depth of the groove (1C) is preferably set shallower and the width wider than the rigidity of the impact receiving section (1) can be ensured sufficiently and the curving may be avoided without fail. However, when the width of the groove is formed widely as far as to the roots (2b) of the supporting sections (2), the deforming of the impact receiving section (1) occur at the corner portion in the bottom of the groove (1C) as the starting point, as similarly as simply reducing the thickness of the impact receiving section (1), therefore, the uppermost limit of the width of the groove (1C) should be set within a range, where the deforming of the impact receiving section (1) occur at the root (2b) of the supporting sections (2) as the starting point. FIGS. 6 through 8 are front views showing deformations of the fender (A) described above at each compression ratio, from which it is also clear that the deforming does not occur on the impact receiving section (1) for the fender (A) mentioned above.

The groove (1C) formed as a hollow portion for preventing the curving of the impact receiving section (1) may have an inverted U-shaped cross section, for instance, or an inverted V-shaped cross section provided with a globular top other than the trapezoid-shaped cross section as shown in the drawings. Besides, the same effect as mentioned above can be expected when the chopped-head conical holes are formed at a fixed interval lengthwise in place of the groove (1C). In any case a hollow portion may be formed not only in a single row but also in a plurality of rows symmetrically arranged will do either.

The elastically deformable fender according to the present invention is capable of restraining the excessive increase of the reaction force during the initial stage of the impact load being applied by the approaching broadside of a ship, and exhibiting the considerably high impact energy absorbing performance by preventing the curving of the impact receiving section at the start of the application of the impact load, retarding the bent of the supporting sections and delaying the contact of the bent impact receiving section with the broadside as much as possible, since the hollow portion such as the groove etc. is formed on the reverse side of the impact receiving section and serving as the space for relief of the rubber at the start of the application of the impact load, the curving of the impact receiving section can be prevented assuredly even when selecting the width of the impact receiving selection widely, and the constant and uniform contact of the impact receiving section with the broadside is attainable, thus eliminating the concentration of the stress and avoiding such disadvantages as inflicting the damage of denting the broadside of a ship.

What is claimed is:

1. An elastically deformable fender, comprising:
   (a) an impact receiving section having a substantially unitary flat contact surface and a predetermined thickness;
   (b) a pair of supporting sections extending directly from both ends of the side of said impact receiving section opposite said unitary flat contact surface, said supporting sections diverging in an unfolded fan fashion and formed integrally with said impact receiving section, and ending in opposing position heels, said supporting sections having respective inward bends, the portion of said supporting sections below said bends comprising said heels; and
   (c) a fitting section adjacent said respective heels extending outwardly from said respective heels in parallel to said unitary flat contact surface;
   wherein said impact receiving section protrudes from the supporting sections by said predetermined thickness, the width of said impact receiving section being smaller than the span between the heels of the supporting sections; and
   (d) means for preventing the impact centered receiving section from curving comprising a single groove at the center of said opposite side of said impact receiving section, said groove extending lengthwise along the fender and between said supporting sections on said opposite side.

2. An elastically deformable fender as claimed in claim 1, wherein said groove for preventing the curving has a depth less than approximately half of the thickness of the impact receiving section.

3. An elastically deformable fender as claimed in claim 1, wherein said groove for preventing the curving comprises a groove formed continuously lengthwise along the fender.

* * * * *